(12) United States Patent
Cai et al.

(10) Patent No.: US 8,347,362 B2
(45) Date of Patent: Jan. 1, 2013

(54) USAGE CONTROL SERVICES PERFORMED IN AN END USER DEVICE

(75) Inventors: Yigang Cai, Naperville, IL (US); Suzann Hua, Lisle, IL (US)

(73) Assignee: Alcatel Lucent, Paris (FR)

( * ) Notice: Subject to any disclaimer, the term of this patent is extended or adjusted under 35 U.S.C. 154(b) by 306 days.

(21) Appl. No.: 12/570,242

(22) Filed: Sep. 30, 2009

(65) Prior Publication Data
US 2011/0078767 A1  Mar. 31, 2011

(51) Int. Cl.
*G06F 21/00* (2006.01)

(52) U.S. Cl. ............ 726/4; 380/233; 455/406; 455/410; 705/30

(58) Field of Classification Search .................. None
See application file for complete search history.

(56) References Cited

U.S. PATENT DOCUMENTS

| | | | |
|---|---|---|---|
| 7,457,609 B2 | 11/2008 | Cai | |
| 7,958,234 B2 * | 6/2011 | Thomas et al. | 709/224 |
| 2005/0027624 A1 * | 2/2005 | Cai | 705/32 |
| 2005/0130633 A1 * | 6/2005 | Hill et al. | 455/414.1 |
| 2005/0282531 A1 * | 12/2005 | Andreasson | 455/418 |
| 2005/0282559 A1 * | 12/2005 | Erskine et al. | 455/456.4 |
| 2007/0079381 A1 * | 4/2007 | Hartung et al. | 726/26 |
| 2009/0124242 A1 * | 5/2009 | Koo | 455/415 |
| 2010/0146607 A1 * | 6/2010 | Piepenbrink et al. | 726/7 |
| 2010/0191612 A1 * | 7/2010 | Raleigh | 705/26 |

* cited by examiner

*Primary Examiner* — Fikremariam A Yalew
(74) *Attorney, Agent, or Firm* — Duft Bornsen & Fishman LLP

(57) ABSTRACT

Systems and methods are disclosed for providing usage control of communication services within an end user device. A system in the network receives input from a controlling party defining usage restrictions for the end user device. The system then generates a usage control profile, and transmits the usage control profile to the end user device. The end user device then monitors activities in the device to identify a communication attempt (e.g., an incoming voice call). When a communication attempt is identified, the end user device processes the usage control profile to determine whether the communication attempt is authorized, and allows the communication attempt to continue if the attempt is authorized. If the attempt is not authorized, then the end user device blocks the communication attempt.

20 Claims, 10 Drawing Sheets

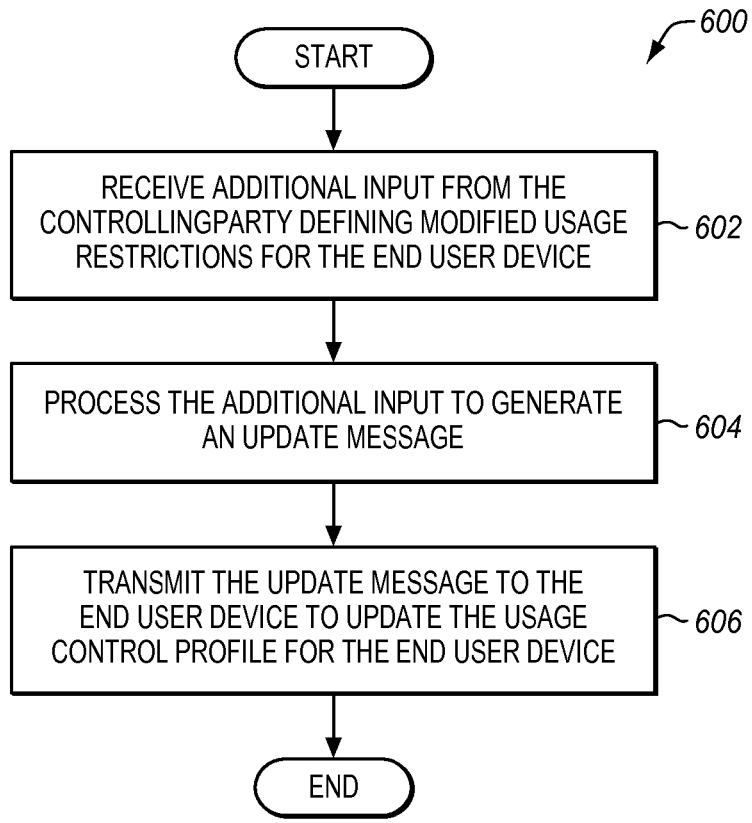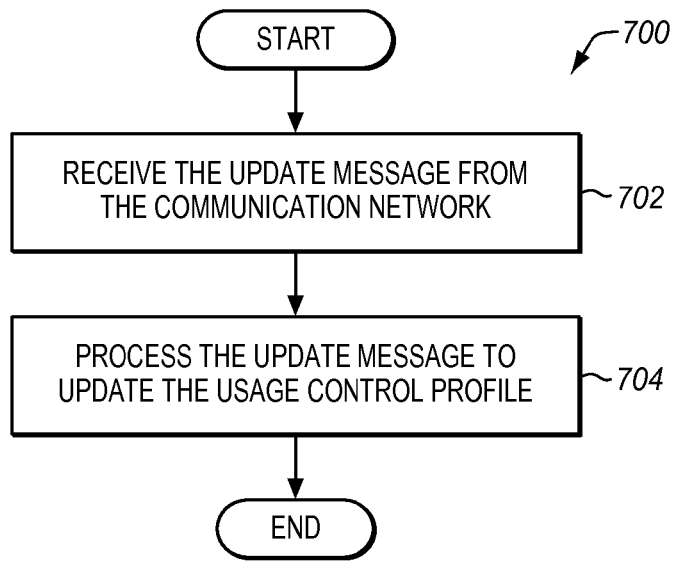

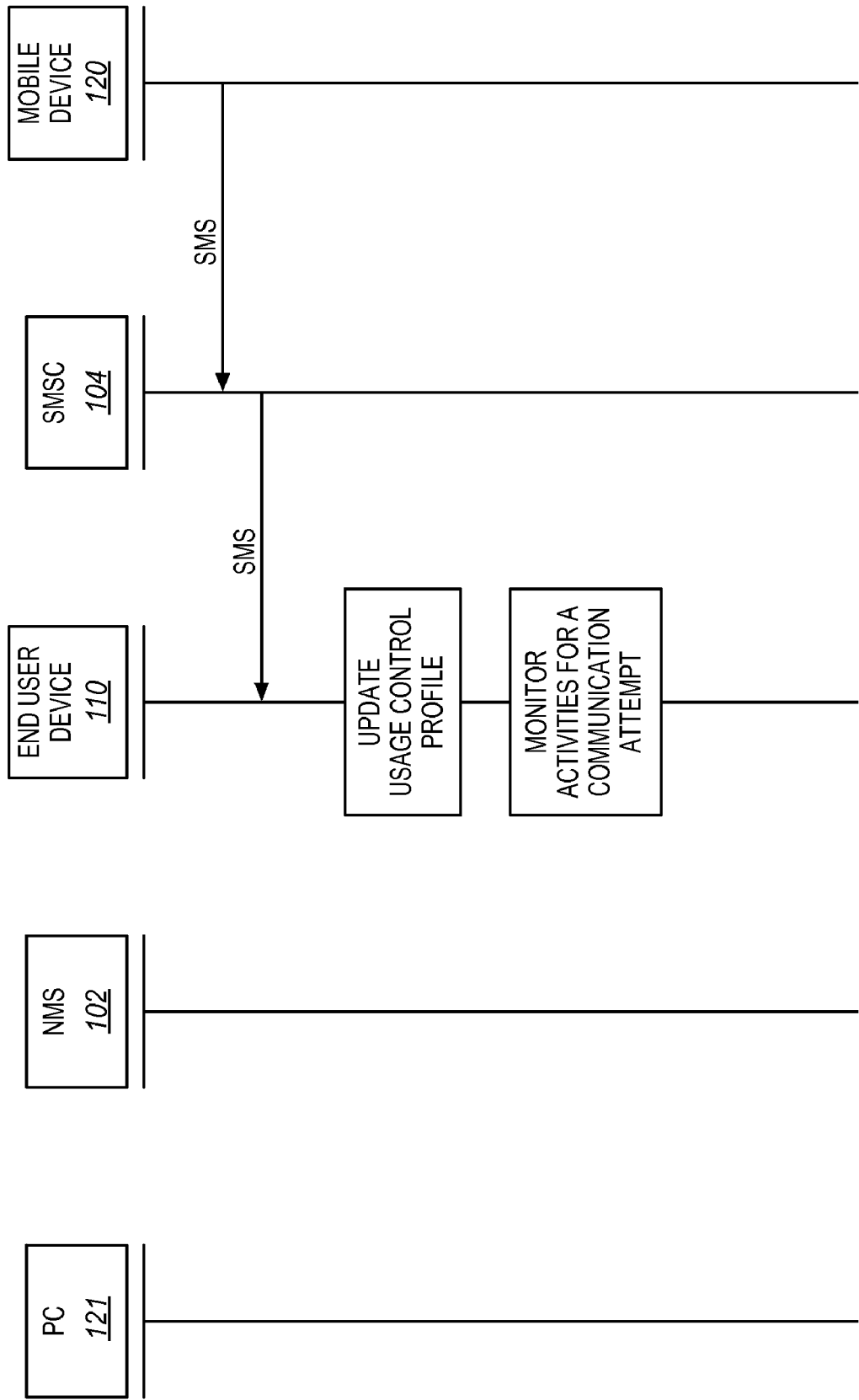

USAGE CONTROL SERVICES PERFORMED IN AN END USER DEVICE

BACKGROUND

1. Field of the Invention

The invention is related to the field of communication networks and, in particular, to usage control services offered by service providers.

2. Statement of the Problem

Service providers offer a variety of plans for mobile services, landline services, VoIP services, etc. There are instances where a person of authority subscribes to a service plan on behalf of another. For example, a parent may subscribe to a service plan for their child. In another example, an employer may subscribe to a service plan for an employee. The service plans may be individual or may be a shared plan. The person of authority may desire some control over how an end user utilizes services under the subscription. Thus, some service providers have implemented usage control services. Usage control services allow a party to limit the communication services that are available to an end user, such as to place a voice call, receive a voice call, send a text/multimedia message, receive a text/multimedia message, etc. For example, if a parent gives a child a cell phone, the parent may subscribe to a usage control service offered by the service provider. Usage control services such as this may also be referred to as "parent control" or "parent patrol". Through the usage control service, the parent may specify when the child is allowed to place or receive voice calls, who the child is allowed to communicate with or not allowed to communicate with, whether the child is allowed to send or receive text/multimedia messages, etc. For instance, the parent may specify that the child is not allowed to place or receive voice calls during school hours or after 9 p.m. The parent may also specify that the child is not allowed to place toll calls (e.g., 1-900 calls), or that the child is not allowed to call a set of numbers (also referred to as a black list).

Presently, usage control services are performed within the network of the service provider. For example, when a communication attempt (e.g., voice call, text/multimedia message, etc) is received in a network element of the communication network, such as in a Mobile Switching Center (MSC) or a Short Message Service Center (SMSC), the network element determines whether the communication attempt is allowed under the usage control service. Unfortunately, only network-based solutions presently exist for usage control services.

SUMMARY

Embodiments described herein provide usage control services within an end user device instead of in the network. The end user device receives a usage control profile from the network that includes usage restrictions defined by a controlling party (i.e., a person of authority such as a parent, employer, etc). When a communication attempt is identified in the end user device, the end user device processes the usage control profile to determine whether or not the communication attempt is allowed. Thus, the usage control is performed locally on the end user device. This advantageously saves network resources and unnecessary traffic in the network by moving usage control from the network to the end user device, especially for outgoing voice calls or text/multimedia messages.

One embodiment comprises a network management system in the communication network. The network management system includes a subscriber interface operable to receive input from a controlling party defining usage restrictions for an end user device. The network management system further includes a control system operable to process the input from the controlling party to generate a usage control profile for the end user device. The network management system further includes a device interface operable to transmit the usage control profile to the end user device so that the end user device is able to provide usage control based on the usage control profile.

Another embodiment comprises the end user device. The end user device includes a network interface operable to receive the usage control profile from the communication network. The end user device further includes a usage control system operable to monitor activities in the end user device to identify a communication attempt, and to process the usage control profile to determine whether the communication attempt is authorized. If the communication attempt is authorized, then the usage control system is further operable to allow the communication attempt to continue. If the communication attempt is not authorized, then the usage control system is further operable to block the communication attempt in the end user device.

The invention may include other exemplary embodiments described below.

DESCRIPTION OF THE DRAWINGS

Some embodiments of the present invention are now described, by way of example only, and with reference to the accompanying drawings. The same reference number represents the same element or the same type of element on all drawings.

FIG. 6 is a flow chart illustrating a method of updating a usage control profile in an exemplary embodiment.

FIG. 7 is a flow chart illustrating an additional method of updating a usage control profile in an exemplary embodiment.

FIGS. 10-13 illustrate an example of performing usage control within an end user device in an exemplary embodiment.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
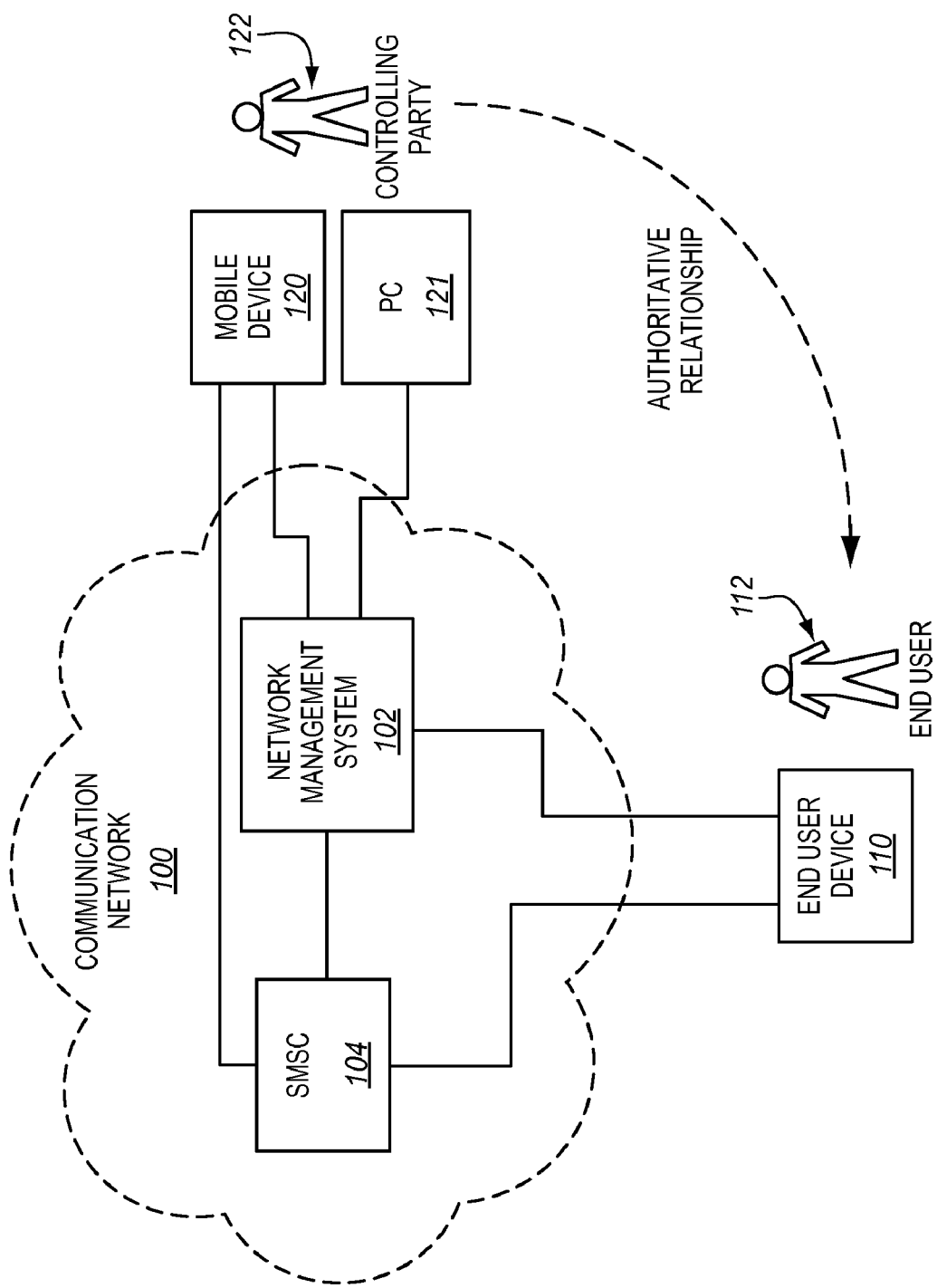
FIG. 1 illustrates a communication network in an exemplary embodiment of the invention.

FIG. 1 illustrates a communication network 100 in an exemplary embodiment. Communication network 100 may comprise a mobile network, such as a CDMA network or a UMTS/GSM network, or may comprise a fixed-line network, such as a PSTN. Communication network 100 may also comprise a circuit-switched network or a packet network. For example, communication network 100 may comprise an IP Multimedia Subsystem (IMS) network in one embodiment. Communication network 100 is shown as including a network management system 102 and a Short Message Service Center (SMSC) 104. Those skilled in the art will appreciate that communication network 100 may include other network elements that are not shown for the sake of brevity, such as a Mobile Switching Center (MSC), a Home Location Register (HLR), a Serving-Call Session Control Function (S-CSCF), a Home Subscriber Server (HSS), an application server, a Multimedia Message Center (MMSC), etc.

Communication network 100 is operable to provide communication services to an end user device 110 that is operated by end user 112. End user device 110 as described herein comprises some type of communication device that is used for voice calls, text/multimedia messaging, data sessions, or other types of communication over communication network 100. The end user device may be a mobile device, such as a cellular phone, a mobile VoIP phone, etc. The end user device may alternatively be a fixed-line device, such as a legacy phone, an Ethernet-connected VoIP phone, etc. The term "end user device" may also be referred to as User Equipment (UE), an end-user terminal, or an end-user station.

End user 112 has subscribed to a service plan offered by a service provider that is operating communication network 100. One assumption is that the service plan of end user 112 is under the control of a person of authority. In other words, the person of authority is able to control how end user 112 utilizes communication services under the service plan. The person of authority has some type of family relationship, business relationship, or other type of authoritative relationship over end user 112. For example, the person of authority may comprise a parent while end user 112 comprises a child of the parent. In another example, the person of authority may comprise an employer while end user 112 comprises an employee. The person of authority is generally referred to in FIG. 1 as controlling party 122.

To allow controlling party 122 to control the service plan of end user 112, communication network 100 is able to receive input from controlling party 122. As an example, controlling party 122 may access network management system 102 through a mobile device 120, a PC 121, etc, such as through a website. Based on the input from controlling party 122, communication network 100 generates a usage control profile and sends the usage control profile to end user device 110. End user device 110 then limits the communication services available to end user 112 based on the usage control profile, which is referred to as "usage control".

Figure 2:
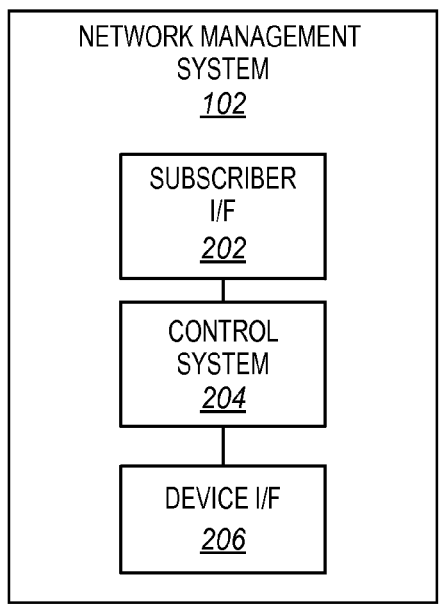
FIG. 2 illustrates a network management system in an exemplary embodiment.

FIG. 2 illustrates network management system 102 in an exemplary embodiment. Network management system 102 comprises a system or server implemented in communication network 100 by the service provider to manage how communication services are provided, one example of which is an Operations Support System (OSS). In this embodiment, network management system 102 includes a subscriber interface 202, a control system 204, and a device interface 206. Subscriber interface 202 comprises any components, devices, or functions operable to communicate with controlling party 122. Through subscriber interface 202, controlling party 122 is able to control the service plan of end user 112. Control system 204 comprises any components, devices, or functions operable to generate a usage control profile for end user device 110. The usage control profile is configured to enable end user device 110 to control usage of communication services by end user 112. Device interface 206 comprises any components, devices, or functions operable to communicate with end user device 110. Device interface 206 may communicate with end user device 110 through Over-The-Air (OTA) programming, through SMS messaging, or through another type of communication.

Figure 3:
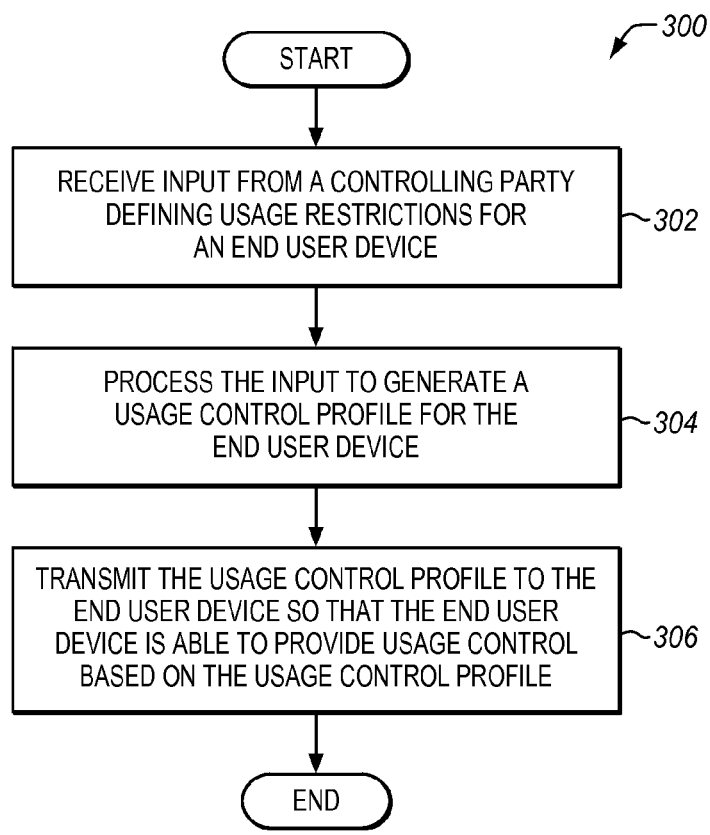
FIG. 3 is a flow chart illustrating a method of generating a usage control profile in an exemplary embodiment.

FIG. 3 is a flow chart illustrating a method 300 of generating a usage control profile in an exemplary embodiment. The steps of method 300 will be described with reference to communication network 100 in FIG. 1 and network management system 102 in FIG. 2, but those skilled in the art will appreciate that method 300 may be performed in other networks and systems. Also, the steps of the flow charts described herein are not all inclusive and may include other steps not shown, and the steps may be performed in an alternative order.

In step 302, subscriber interface 202 receives input from controlling party 122 defining usage restrictions for end user device 110. A usage restriction is a limit on the communication services that are available to end user 112 through end user device 110. For example, end user 112 may have access to voice calls, text/multimedia messaging, and data services through end user device 110. The usage restrictions may put a limit on the voice calls, text/multimedia messaging, and data services that are available to end user 112.

Subscriber interface 202 may receive the input from controlling party 122 in a variety of ways. In one embodiment, subscriber interface 202 may provide a website that is accessible to controlling party 122 through mobile device 120 or PC 121 (see FIG. 1), which allows controlling party 122 to enter the input. Controlling party 122 may enter a directory number for end user device 110 into the website. The website may then identify the service plan associated with end user device 110, and provide or display information about the service plan of end user 112 and the communication services available to end user 112. The website may also provide or display options for the usage restrictions that are selectable by controlling party 122 as the input. For example, the website may provide an option to restrict voice calls, and allow controlling party 122 to enter a time period for the restriction, one or more directory numbers that are restricted, a location where the voice calls are restricted, etc. Those skilled in the art will appreciate that controlling party 122 can enter a variety of usage restrictions as input, such as time of day or day of the week limitations, white lists, black lists, time limits per day, per week, or per month, service type limits (e.g., voice call, text/multimedia, games, IP TV, etc), or other restrictions.

In step 304, control system 204 processes the input from controlling party 122 to generate a usage control profile for end user device 110. The usage control profile comprises any data that indicates the usage restrictions defined by controlling party 122. Because usage control is performed in end user device 110 instead of in communication network 100, control system 204 configures the usage control profile to provide usage control within end user device 110.

In step 306, device interface 206 transmits the usage control profile to end user device 110 so that end user device 110 is able to provide usage control. Device interface 206 may transmit the usage control profile directly to end user device 110. For example, if end user device 110 comprises a mobile device, then device interface 206 may transmit the usage control profile to end user device 110 using OTA programming. Alternatively, device interface 206 may transmit an SMS message to SMSC 104 that includes an instruction for end user device 110 to download the usage control profile from a network location. The SMS message may also include the address for the location. SMSC 104 then forwards the SMS message to end user device 110. In response to the SMS message, end user device 110 downloads the usage control profile from communication network 100.

Figure 4:
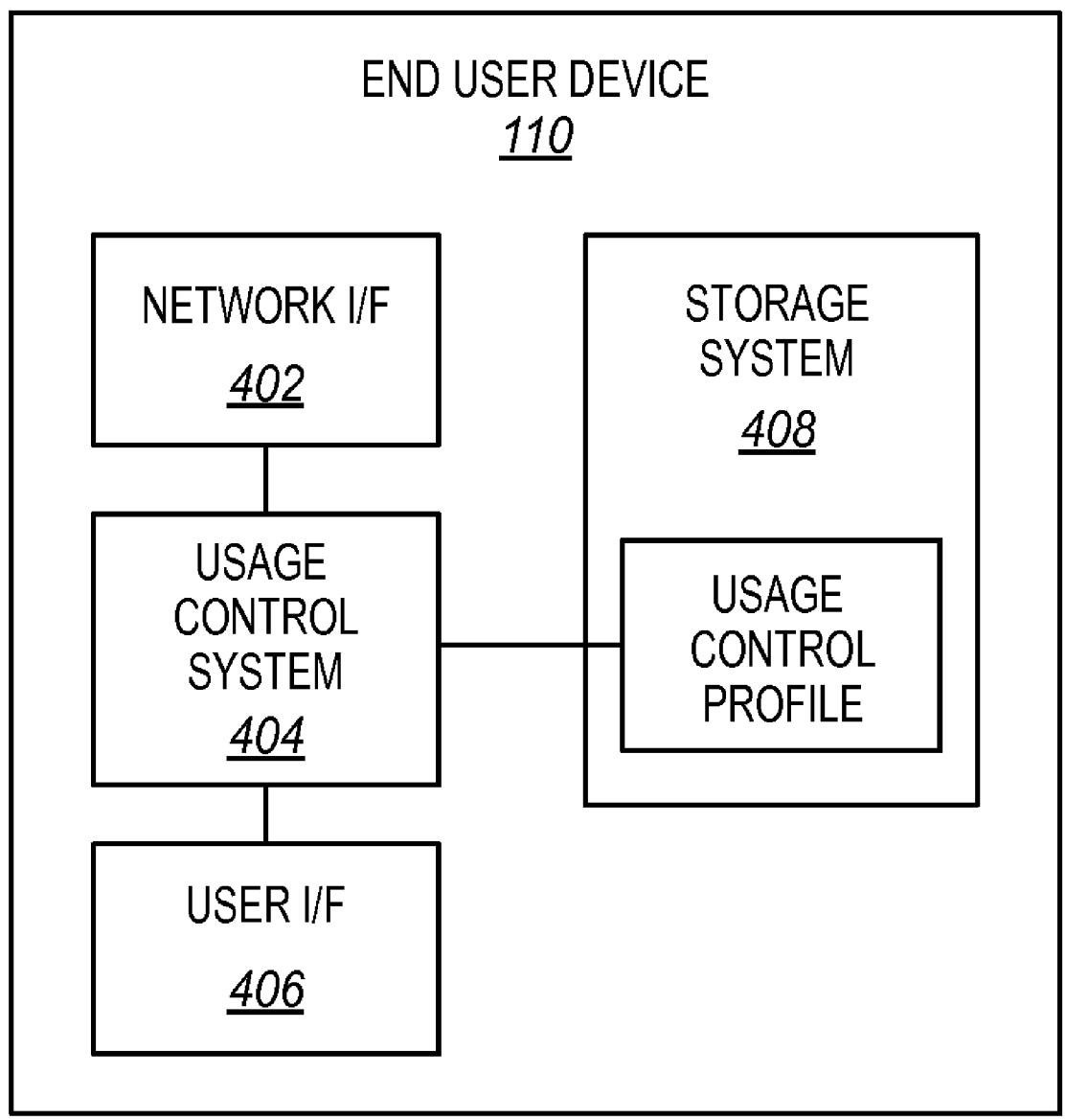
FIG. 4 illustrates an end user device in an exemplary embodiment.

FIG. 4 illustrates end user device 110 in an exemplary embodiment. End user device 110 includes a network interface 402, a usage control system 404, a user interface 406, and a storage system 408. Network interface 402 comprises any components, devices, or functions operable to communicate with communication network 100. Usage control system 404 comprises any components, devices, or functions operable to perform usage control within end user device 110 based on a usage control profile. Usage control as described herein refers to limiting the communication services that are available to an end user. User interface 406 comprises any components, devices, or functions operable to receive input from an end user, such as a keypad, a pointing device, etc, and/or convey content to the end user, such as a display, a speaker, etc. Storage system 408 comprises any memory or cache that stores files or other data. In FIG. 4, storage system 408 is shown as storing a usage control profile. In other embodiments, storage system 408 may store software or an application executable by usage control system 404 for providing the usage control.

Figure 5:
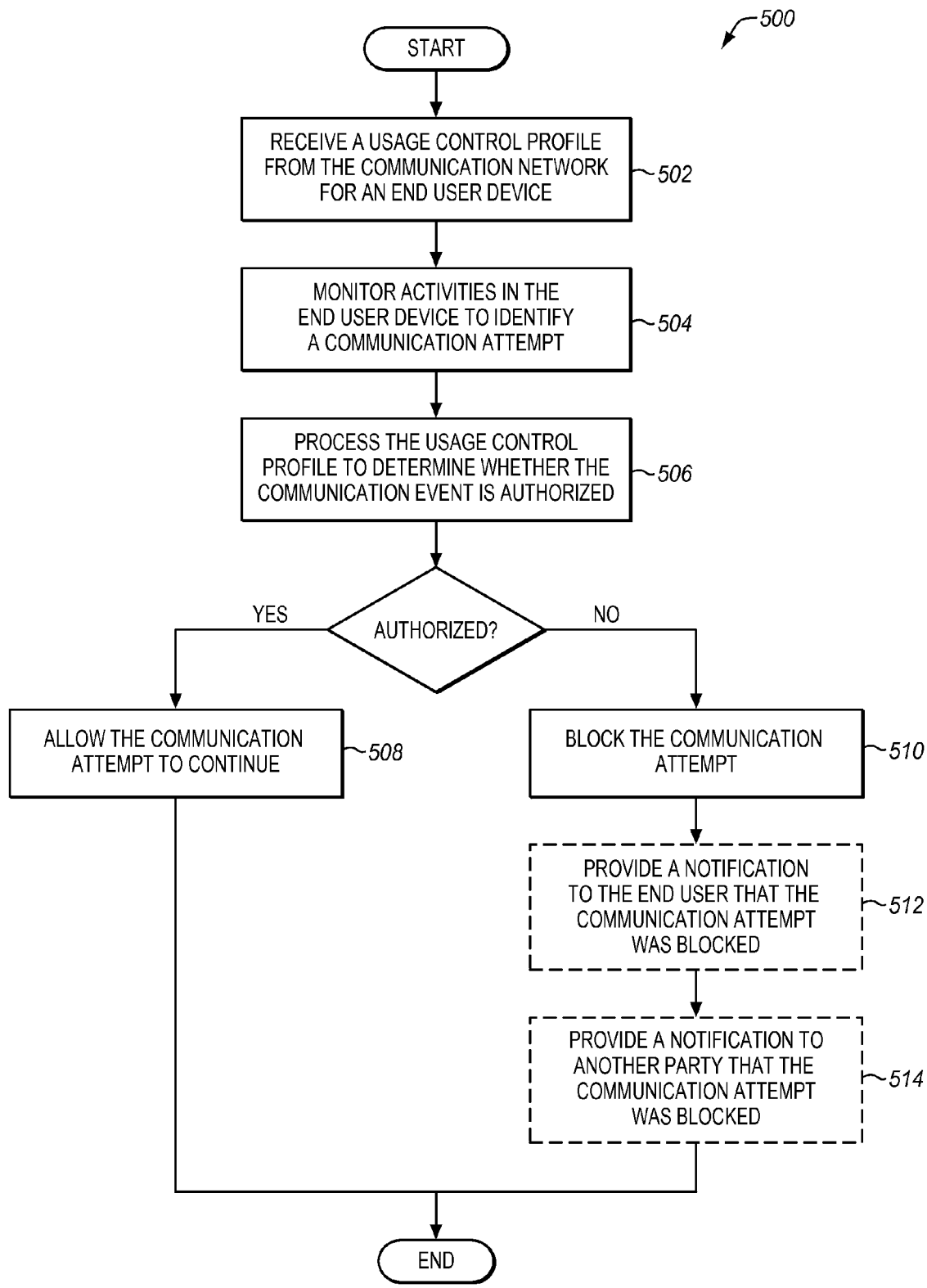
FIG. 5 is a flow chart illustrating a method of providing usage control in an end user device in an exemplary embodiment.

FIG. 5 is a flow chart illustrating a method 500 of providing usage control in end user device 110 in an exemplary embodiment. The steps of method 500 will be described with reference to communication network 100 in FIG. 1 and end user device 110 in FIG. 4, but those skilled in the art will appreciate that method 500 may be performed in other networks and systems.

In step 502, network interface 402 receives the usage control profile from communication network 100. Usage control system 404 may then store the usage control profile in storage system 408. Usage control system 404 then monitors activities in end user device 110 to identify a communication attempt in step 504. A communication attempt comprises an action or actions performed within end user device 110 to initiate or terminate a communication. Examples of communication attempts include initiating an incoming voice call, terminating an outgoing voice call, sending an outgoing text message, receiving an incoming text message, initiating a data session, etc. As an example of monitoring activities, usage control system 404 may monitor user interface 406 to identify if end user 112 attempts to place an outgoing voice call, send a text/multimedia message, initiate a data session, etc. Usage control system 404 may also monitor signaling messages received through network interface 402 to identify if end user device 110 has received an incoming voice call, received a text/multimedia message, etc.

When a communication attempt is identified, usage control system 404 processes the usage control profile to determine whether the communication attempt is authorized in step 506. The usage control profile indicates usage restrictions defined by controlling party 122 (see FIG. 1). Usage control system 404 determines whether the communication attempt falls within one of the defined usage restrictions. For example, one of the usage restrictions may be voice calls allowed only between 3:00 p.m. and 9:00 p.m. If the communication attempt comprises a voice call that occurs at 11:00 a.m., then usage control system 404 determines that the communication attempt is not authorized. However, if the communication attempt comprises a voice call that occurs at 5:00 p.m., then usage control system 404 determines that the communication attempt is authorized.

If the communication attempt is authorized based on the usage control profile, then usage control system 404 allows the communication attempt to continue in step 508. For example, if the communication attempt comprises an outgoing voice call, then usage control system 404 will allow end user device 110 to send the appropriate signaling to communication network 100 to attempt call setup. However, if the communication attempt is not authorized, then usage control system 404 blocks the communication attempt in end user device 110 in step 510. For example, if the communication attempt comprises an outgoing voice call, then usage control system 404 will block the end user device 110 from sending the appropriate signaling to communication network 100 to attempt call setup. If the communication attempt comprises an incoming voice call, then usage control system 404 will block the end user device 110 from providing a call alert (e.g., ringing), and will send the appropriate signaling to communication network 100 to reject call setup.

If the communication attempt comprises an outgoing text/multimedia message, then usage control system 404 will block the end user device 110 from sending the text/multimedia message to communication network 100. In some embodiments, usage control system 404 may store the text/multimedia message until the text/multimedia message is authorized according to the usage control profile. When the text/multimedia message is authorized, usage control system 404 may send the text/multimedia message to communication network 100 for delivery to its destination.

If the communication attempt comprises an incoming text/multimedia message, then usage control system 404 will block the end user device 110 from being displayed to end user 112. In some embodiments, usage control system 404 may store the text/multimedia message until the text/multimedia message is authorized according to the usage control profile. When the text/multimedia message is authorized, usage control system 404 may display the text/multimedia message to end user 112.

If the communication attempt is blocked by usage control system 404 in step 510, then user interface 406 may optionally provide a notification to end user 112 that the communication attempt was blocked due to usage control in step 512. For example, user interface 206 may display a message such as "There is an incoming voice call from 630-123-4567 that was blocked" or "You are not allowed to place a voice call to this number".

Further, if the communication attempt is blocked by usage control system 404, then usage control system 404 may optionally provide a notification to another party (other than end user 112) that the communication attempt was blocked due to usage control in step 514. For example, usage control system 404 may send the notification to controlling party 122 indicating that the communication attempt was blocked. The notification to controlling party 122 may include details about the communication attempt, such as a directory number and/or name of the person being called by end user 112, a time of the call attempt, etc. The notification to controlling party 122 may comprise an SMS message, an MMS message, an email, etc.

In another example, usage control system 404 may send the notification to the other party involved in the communication attempt indicating that the communication attempt was blocked. For instance, if the communication attempt comprises an incoming voice call or incoming text/multimedia message, then usage control system 404 may send the notification to the party that initiated the voice call or sent the text/multimedia message so that this party is informed as to why the communication failed. The notification to the other party to the communication attempt may comprise an SMS message, an MMS message, etc.

By providing the usage control profile to end user device 110, usage control may be performed within end user device 110 as opposed to communication network 100. This advantageously saves resources within communication network 100 and avoids unnecessary traffic within communication network 100.

Controlling party 122 may change the usage restrictions for end user device 110 if desired. In one embodiment, controlling party 122 may again access network management system 102 to change the usage restrictions as in shown in FIG. 6. FIG. 6 is a flow chart illustrating a method 600 of updating a usage control profile in an exemplary embodiment. The steps of method 600 will be described with reference to communication network 100 in FIG. 1 and network management system 102 in FIG. 2, but those skilled in the art will appreciate that method 600 may be performed in other networks and systems.

In step 602, subscriber interface 202 receives additional input from controlling party 122 defining new or modified usage restrictions for end user device 110 to update the usage control profile. Subscriber interface 202 may again receive the input from controlling party 122 through a website. In step 604, control system 204 processes the additional input from controlling party 122 to generate an update message. The update message includes data that indicates the new or modified usage restrictions defined for end user device 110. In step 606, device interface 206 transmits the update message to end user device 110.

FIG. 7 is a flow chart illustrating an additional method 700 of updating the usage control profile in an exemplary embodiment. The steps of method 700 will be described with reference to communication network 100 in FIG. 1 and end user device 110 in FIG. 4, but those skilled in the art will appreciate that method 700 may be performed in other networks and systems.

In step 702, network interface 402 receives the update message from communication network 100. In step 704, usage control system 404 processes the update message to update the usage control profile stored in storage system 408. The updated usage control profile will thus indicate the new or modified usage restrictions defined by controlling party 122. Usage control system 404 will then perform usage control within end user device 110 based on the updated usage control profile.

In an alternative embodiment, controlling party 122 may update the usage control profile directly through SMS (or MMS) messages. In FIG. 1, if controlling party 122 wants to update the usage control profile, then controlling party 122 may generate an SMS message in mobile device 120 that is formatted in a particular manner to indicate the new or modified usage restrictions. For example, the SMS message may look like:

To: (number for end user device 110)
  From: (number for mobile device 120)
  For usage control:
    timeOfDayLimit=3:00 p.m. to 9:00 p.m. (no school time calls)
    minutesOfDayLimit=100 minutes
    serviceTypeAllowed=voice, SMS Mobile device 120 then sends the SMS message to SMSC 104. SMSC 104 performs store-and-forward processing on the SMS message to forward the SMS message to end user device 110. Network interface 402 (see FIG. 4) receives the SMS message, and usage control system 404 parses the SMS message to identify the new or modified usage restrictions. Usage control system 404 then updates the usage control profile stored in storage system 408 based on the new or modified usage restrictions defined by controlling party 122. Although the above embodiment illustrated SMS messages for updating the usage control profile, MMS messaging or any other text or multimedia messaging protocol may be used for updating the usage control profile.

Figure 8:
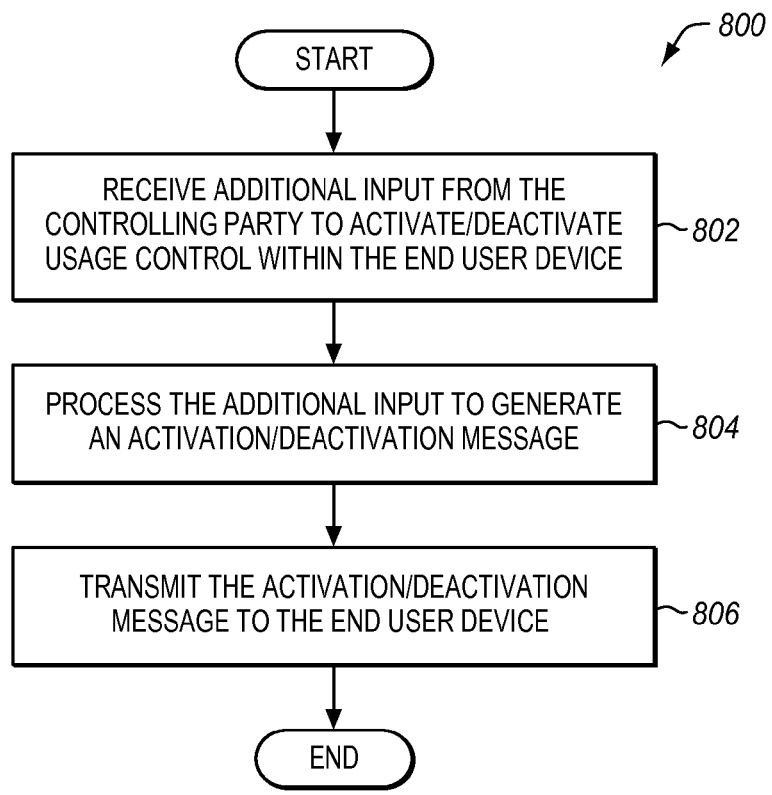
FIG. 8 is a flow chart illustrating a method of activating usage control in an exemplary embodiment.
Figure 9:
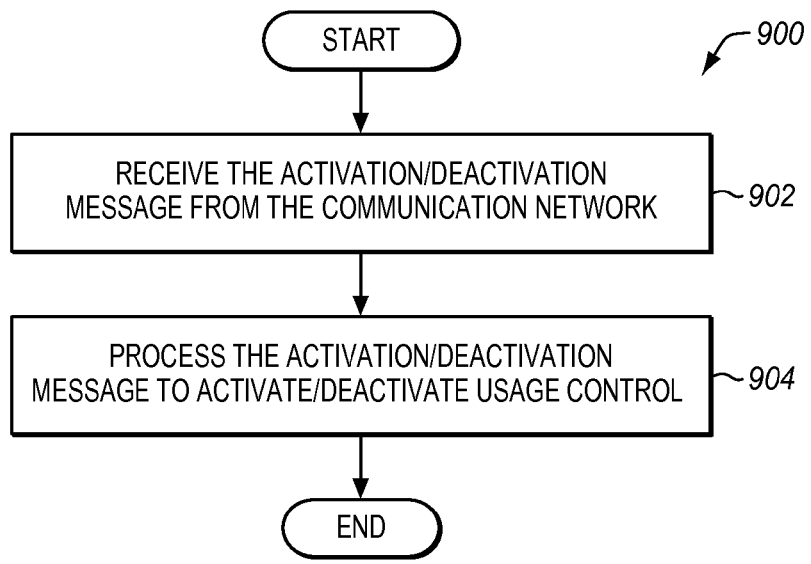
FIG. 9 is a flow chart illustrating an additional method of activating usage control in an exemplary embodiment.

Controlling party 122 may also activate or deactivate usage control within end user device 110 as is illustrated in FIGS. 8-9. FIG. 8 is a flow chart illustrating a method 800 of activating usage control in an exemplary embodiment. The steps of method 800 will be described with reference to communication network 100 in FIG. 1 and network management system 102 in FIG. 2, but those skilled in the art will appreciate that method 800 may be performed in other networks and systems.

In step 802, subscriber interface 202 receives additional input from controlling party 122 to activate usage control in end user device 110. In step 804, control system 204 processes the additional input from controlling party 122 to generate an activation message. The activation message includes an instruction to activate usage control. In step 806, device interface 206 transmits the activation message to end user device 110.

FIG. 9 is a flow chart illustrating an additional method 900 of activating usage control in an exemplary embodiment. The steps of method 900 will be described with reference to communication network 100 in FIG. 1 and end user device 110 in FIG. 4, but those skilled in the art will appreciate that method 900 may be performed in other networks and systems.

In step 902, network interface 402 receives the activation message from communication network 100. In step 904, usage control system 404 processes the activation message to activate usage control based on the usage control profile stored in storage system 408. At this point, usage control is enabled in end user device 110, and usage control system 404 monitors the activities for a communication attempt.

In an alternative embodiment, controlling party 122 may activate usage control directly through SMS (or MMS) messages. In FIG. 1, if controlling party 122 wants to activate usage control, then controlling party 122 may generate an SMS message in mobile device 120 that is formatted in a particular manner to activate usage control in end user device 110. For example, the SMS message may look like:

To: (number for end user device 110)
  From: (number for mobile device 120)
  For usage control:
    UCActivation=y
    ActivationPeriod=1 week Mobile device 120 then sends the SMS message to SMSC 104. SMSC 104 performs store-and-forward processing on the SMS message to forward the SMS message to end user device 110. Network interface 402 (see FIG. 4) receives the SMS message, and usage control system 404 parses the SMS message to identify the instruction to activate usage control. Based on the instruction, usage control system 404 begins monitoring the activities for a communication attempt. Although the above embodiment illustrated SMS messages for activating usage control, MMS messaging or any other text or multimedia messaging protocol may be used for activation.

Similar processes as described above may be used to deactivate usage control within end user device 110. Thus, controlling party 122 can remotely control whether usage control is activated or deactivated within end user device 110.

EXAMPLE

Figure 10:
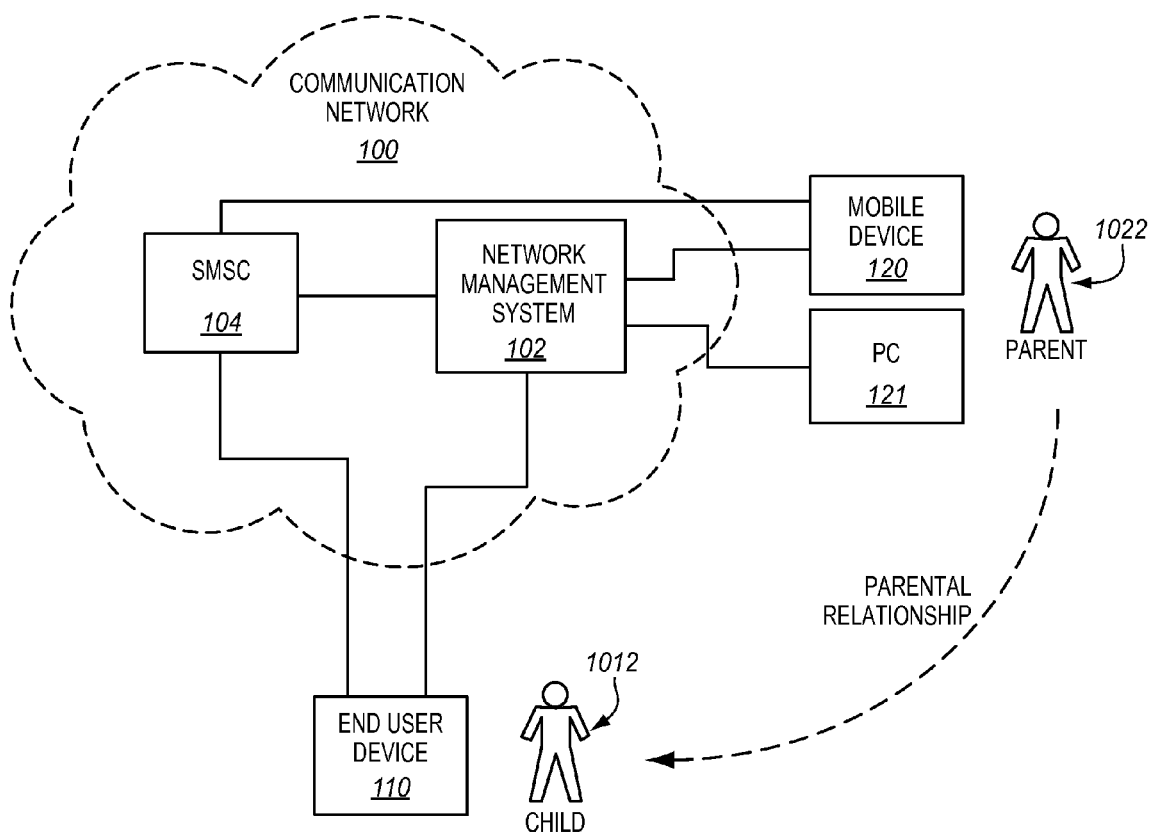

FIGS. 10-13 illustrate an example of performing usage control within an end user device in an exemplary embodiment. FIG. 10 illustrates communication network 100 providing service to an end user device 110 that is operated by a child 1012. End user device 110 in this embodiment is able to provide voice call services and SMS messaging services to child 1012. Child 1012 has subscribed to a service plan offered by a service provider that is operating communication network 100. One assumption is that the service plan of child 1012 is under the control of his/her parent 1022. The service provider offers a usage control service to parent 1022 so that parent 1022 can limit the communication services that are available to child 1012 through end user device 110.

As part of the usage control service, network management system 102 provides a website that allows parent 1022 to access the service plan for child 1012. Thus, parent 1022 navigates to the website using PC 121, and enters the directory number for end user device 110. The website then displays a page to parent 1022 of restriction options for the service plan. Assume for this example that parent 1022 selects an option for limiting voice calls during the school week to a time period between 3:00 p.m. and 9:00 p.m., so that child 1012 will not be able to place voice calls during school hours. Network management system 102 receives the input from parent 1022 through the website.

Figure 11:
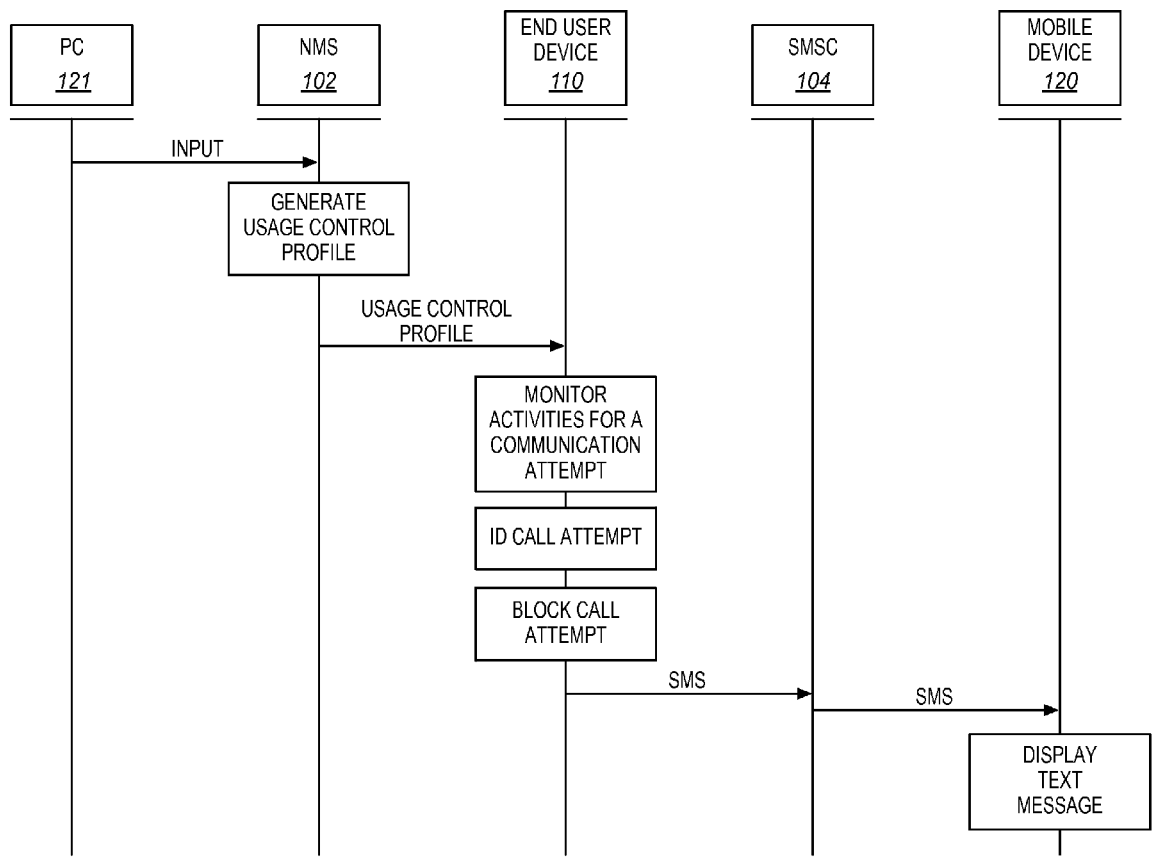

FIG. 11 is a message diagram illustrating usage control in an exemplary embodiment. In FIG. 11, network management system (NMS) 102 receives the input from PC 121 through the website. Network management system 102 then processes the input from parent 1022 to generate a usage control profile for end user device 110. The usage control profile indicates the usage restrictions defined by parent 1022 for child 1012. Network management system 102 then transmits the usage control profile to end user device 110 so that end user device 110 is able to provide usage control.

End user device 110 then monitors activities in end user device 110 to identify a communication attempt. Assume that child 1012 attempts to place a voice call to 630-123-4567 at 1:00 p.m. during the week. In response to the call attempt, end user device 110 identifies a communication attempt. Thus, end user device 110 processes the usage control profile to determine whether the communication attempt is authorized. Because the call attempt is placed outside of the allowed time period of 3:00 p.m. to 9:00 p.m., end user device 110 determines that the call attempt is not authorized. Thus, end user device 110 blocks the call attempt.

In response to blocking the call attempt, end user device 110 provides a notification to child 1012 that the call attempt was blocked due to usage control. For example, end user device 110 may display a message such as "You are not allowed to place a voice call at this time". Further, end user device 110 provides a notification to parent 1022 that the call attempt was blocked due to usage control. To provide the notification to parent 1022, end user device 110 generates an SMS message that includes a text message such as "A voice call placed to 630-123-4567 at 1:00 p.m. was blocked". End user device 110 then sends the SMS message to mobile device 120 of parent 1022. SMSC 104 in communication network 100 receives the SMS message destined for mobile device 120, and performs store-and-forward processing on the SMS message to forward the SMS message to mobile device 120. In response to receiving the SMS message, mobile device 120 displays the text message to parent 1022 so that the parent 1022 is notified of the unauthorized call attempt by child 1012. End user device 110 continues to monitor for communication attempts and perform usage control based on the usage control profile.

Figure 12:
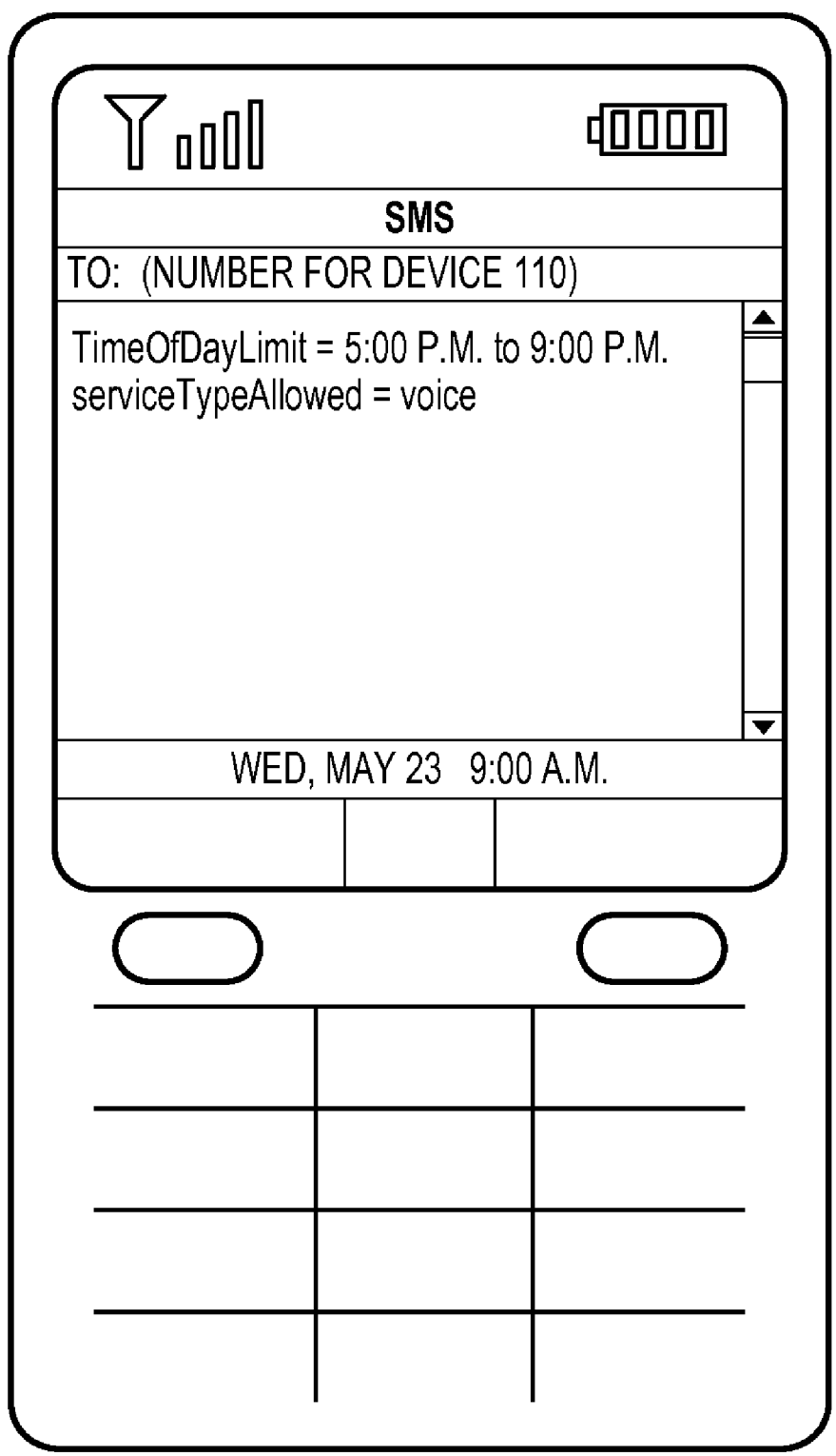

Assume at a later time that parent 1022 wants to modify the usage restrictions of child 1012 to allow voice calls only during the time period between 5:00 p.m. and 9:00 p.m. To do so in this example, parent 1022 generates an SMS message in mobile device 120 that is formatted in a particular manner to indicate the modified usage restrictions. FIG. 12 illustrates an example SMS message for modifying the usage restrictions.

In FIG. 13, mobile device 120 sends the SMS message to end user device 110. SMSC 104 receives the SMS message destined for end user device 110, and performs store-and-forward processing on the SMS message to forward the SMS message to end user device 110. End user device 110 parses the SMS message to identify the modified usage restrictions. End user device 110 then updates the usage control profile for child 1012 based on the modified usage restrictions defined by parent 1022. End user device 110 may then continue to monitor for communication attempts based on the modified usage control profile. Parent 1022 may thus control the usage restriction on end user device 110 remotely through mobile device 120.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. An apparatus comprising:
an end user device that receives communication services from a communication network, the end user device comprising:

a network interface operable to receive a usage control profile from the communication network, wherein the usage control profile defines limits on the communication services available to the end user device over the communication network; and a usage control system operable to monitor activities in the end user device to identify a communication attempt, to process the usage control profile to determine whether the communication attempt is authorized, to allow the communication attempt to continue responsive to a determination that the communication attempt is authorized, and to block the communication attempt in the end user device responsive to a determination that the communication attempt is not authorized;

the usage control system is further operable to provide a notification to a controlling party that the communication attempt was blocked, wherein the controlling party specified the limits on the communication services available to the end user device.

2. The apparatus of claim 1 wherein the end user device further comprises:
a user interface operable to notify an end user that the communication attempt was blocked.

3. The apparatus of claim 1 wherein:
the usage control system is further operable to provide another notification to the other party involved in the communication attempt that the communication attempt was blocked.

4. The apparatus of claim 1 wherein:
the network interface is further operable to receive an update message from the communication network; and
the usage control system is further operable to process the update message to update the usage control profile.

5. The apparatus of claim 4 wherein the update message comprises a text/multimedia message sent by the controlling party.

6. The apparatus of claim 5 wherein:
the usage control system is further operable to parse the text/multimedia message to identify modified usage restrictions inserted in the text/multimedia message, and to update the usage control profile based on the modified usage restrictions.

7. The apparatus of claim 1 wherein if the communication attempt comprises an incoming text/multimedia message, then the usage control system is further operable to store the text/multimedia message until the text/multimedia message is authorized according to the usage control profile, and to allow the text/multimedia message to be displayed to an end user when authorized.

8. The apparatus of claim 1 wherein if the communication attempt comprises an outgoing text/multimedia message, then the usage control system is further operable to store the text/multimedia message until the text/multimedia message is authorized according to the usage control profile, and to allow the text/multimedia message to be sent to the communication network when authorized.

9. The apparatus of claim 1 wherein:
the usage control system is further operable to generate a text message that indicates that the communication attempt was blocked, and to send the text message to a mobile device of the controlling party.

10. The apparatus of claim 1 wherein:
the usage control system is further operable to include details about the communication attempt in the notification to the controlling party.

11. A method operable in an end user device that receives communication services from a communication network, the method comprising:

receiving a usage control profile in the end user device from the communication network, wherein the usage control profile defines limits on the communication services available to the end user device over the communication network;

monitoring activities in the end user device to identify a communication attempt;

processing the usage control profile to determine whether the communication attempt is authorized;

allowing the communication attempt to continue responsive to a determination that the communication attempt is authorized;

blocking the communication attempt in the end user device responsive to a determination that the communication attempt is not authorized; and if the communication attempt was blocked, providing a notification to a controlling party that the communication attempt was blocked, wherein the controlling party specified the limits on the communication services available to the end user device.

12. The method of claim 11 further comprising:
notifying an end user that the communication attempt was blocked.

13. The method of claim 11 further comprising:
providing another notification to the other party involved in the communication attempt that the communication attempt was blocked.

14. The method of claim 11 further comprising:
receiving an update message in the end user device from the communication network; and
processing the update message to update the usage control profile.

15. The method of claim 14 wherein the update message comprises a text/multimedia message sent by the controlling party.

16. The method of claim 15 further comprising:
parsing the text/multimedia message to identify modified usage restrictions inserted in the text/multimedia message; and
updating the usage control profile based on the modified usage restrictions.

17. The method of claim 11 wherein if the communication attempt comprises an incoming text/multimedia message, then:
storing the text/multimedia message until the text/multimedia message is authorized according to the usage control profile; and
allowing the text/multimedia message to be displayed to an end user when authorized.

18. The method of claim 11 wherein if the communication attempt comprises an outgoing text/multimedia message, then:
storing the text/multimedia message until the text/multimedia message is authorized according to the usage control profile; and
allowing the text/multimedia message to be sent to the communication network when authorized.

19. The method of claim 11 wherein providing a notification to a controlling party that the communication attempt was blocked comprises:
generating a text message that indicates that the communication attempt was blocked; and
sending the text message to a mobile device of the controlling party.

20. The method of claim 11 further comprising:
including details about the communication attempt in the notification to the controlling party.

* * * * *